(12) United States Patent
Chen et al.

(10) Patent No.: US 9,331,770 B2
(45) Date of Patent: May 3, 2016

(54) METHOD AND SYSTEM FOR PRECODING OPEN LOOP SPATIAL MULTIPLEXING AND PRECODING INDICATION METHOD

(75) Inventors: Yijian Chen, Shenzhen (CN); Yu Ngok Li, Shenzhen (CN); Yunfeng Sun, Shenzhen (CN); Junfeng Zhang, Shenzhen (CN); Senbao Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 38 days.

(21) Appl. No.: 13/985,105

(22) PCT Filed: Dec. 29, 2011

(86) PCT No.: PCT/CN2011/084878
§ 371 (c)(1),
(2), (4) Date: Sep. 13, 2013

(87) PCT Pub. No.: WO2012/109945
PCT Pub. Date: Aug. 23, 2012

(65) Prior Publication Data
US 2014/0010327 A1  Jan. 9, 2014

(30) Foreign Application Priority Data

Feb. 14, 2011  (CN) .......................... 2011 1 0037435

(51) Int. Cl.
*H04B 7/04* (2006.01)
*H04B 7/06* (2006.01)

(52) U.S. Cl.
CPC ............ *H04B 7/0697* (2013.01); *H04B 7/0456* (2013.01)

(58) Field of Classification Search
CPC .... H04B 1/028; H04B 1/0404; H04B 1/0408; H04B 1/0413; H04B 1/0456; H04B 1/046; H04B 1/0473; H04B 1/0617; H04B 1/0695; H04B 1/0697
USPC ................. 375/260–262, 265, 267, 295, 299; 370/208, 210
See application file for complete search history.

(56) References Cited

U.S. PATENT DOCUMENTS

| | | | | |
|---|---|---|---|---|
| 2010/0118807 | A1* | 5/2010 | Seo et al. | 370/329 |
| 2011/0194551 | A1* | 8/2011 | Lee et al. | 370/342 |
| 2012/0044921 | A1* | 2/2012 | Chung et al. | 370/338 |
| 2013/0021991 | A1* | 1/2013 | Ko et al. | 370/329 |

FOREIGN PATENT DOCUMENTS

| | | |
|---|---|---|
| CN | 101594208 A | 12/2009 |
| CN | 101800628 A | 8/2010 |
| CN | 101826951 A | 9/2010 |
| CN | 101938336 A | 1/2011 |
| CN | 102098143 A | 6/2011 |
| WO | WO-2009/113766 A1 | 9/2009 |

OTHER PUBLICATIONS

International Search Report (in Chinese with English translation) for PCT/CN2011/084878, mailed Mar. 29, 2012; ISA/CN.

* cited by examiner

*Primary Examiner* — Young T Tse
(74) *Attorney, Agent, or Firm* — Harness, Dickey & Pierce, P.L.C.

(57) ABSTRACT

The present document provides a precoding method and system for open loop spatial multiplexing and a precoding indication method. The method includes: in transmission resources, a base station precodes N-layer data to be sent by using $$w_a = \begin{bmatrix} u_a \\ \alpha \cdot u_a \end{bmatrix},$$

wherein $u_a$ is a vector or matrix related to a transmission resource location i; $\alpha$ is a real number or a complex number related to the transmission resource location i; and N is an integer less than or equal to the number of base station transmission antennas.

17 Claims, 2 Drawing Sheets

METHOD AND SYSTEM FOR PRECODING OPEN LOOP SPATIAL MULTIPLEXING AND PRECODING INDICATION METHOD

TECHNICAL FIELD

The present document relates to the field of the mobile communication technology, and in particular, to a precoding method and system for open loop spatial multiplexing and a precoding indication method.

BACKGROUND OF THE RELATED ART

In the wireless communication system, a spatial multiplexing mode is adopted between a sending end and a receiving end and multiple antennas are used to obtain higher transmission rate. The common spatial multiplexing technology based on the closed loop feedback can be described as that: the receiving end feeds back the channel state information (abbreviated as CSI) to the sending end, the sending end uses some transmission precoding technologies according to the acquired channel information, and thus the transmission performance is greatly improved.

However, in the real application, the closed loop spatial multiplexing technology is not applicable sometimes; for example, the link quality of the uplink feedback is poor and the channel information cannot be fed back accurately. Again for example, the movement speed of the terminal is very fast, so the channel between the base station and the terminal changes very fast (the movement leads to the Doppler frequency shift, and brings the changes on the time domain); the time delay brought by the feedback link and the schedule, etc., makes the fed back CSI information of the previous channel be unable to represent the real-time channel information very well, which causes mismatching of the precoding. In this case, the open loop spatial multiplexing can support the space multiplexing well in the case of not obtaining the channel state information.

The current open loop spatial multiplexing technology only supports the situation of a single user, for example, in the long term evolution (abbreviated as LTE), the specified open loop precoding technology is:

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(\upsilon-1)}(i) \end{bmatrix}$$

Wherein, $$\begin{bmatrix} x^{(0)}(i) \\ \vdots \\ x^{(\upsilon-1)}(i) \end{bmatrix}$$

is a symbol to be sent, $\upsilon$ is the number of layers of the transmission data, U matrix is a matrix related to the number of layers $\upsilon$, $D(i)$ is a matrix related to a frequency location i and the number of layers $\upsilon$. U and $D(i)$ are shown in the following table:

TABLE 1

| The number of layers $\upsilon$ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

$W(i)$ is a matrix related to the frequency location i and the number of layers $\upsilon$. When the number of transmission antennas is 2, $W(i)$ is a fixed 2×2 unit matrix; when the number of transmission antennas is 4, the value of the $W(i)$ can be $C_1$, $C_2$, $C_3$, $C_4$, and the specific value is related to the value of i; the $C_1$, $C_2$, $C_3$, $C_4$ are the code words of which the indexes corresponding to the $\upsilon$ layers are 12, 13, 14 and 15 in the 4 antennas codebook (table 2).

TABLE 2

| | | The number of layers v | | | |
|---|---|---|---|---|---|
| Index $u_n$ | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |

TABLE 2-continued

| | | The number of layers v | | |
|---|---|---|---|---|
| Index $u_n$ | 1 | 2 | 3 | 4 |
| 5  $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6  $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7  $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8  $u_8 = [1\ -1\ 1\ 1]^T$ | $W_8^{\{1\}}$ | $W_8^{\{124\}}/\sqrt{2}$ | $W_8^{\{134\}}/\sqrt{3}$ | $W_8^{\{1234\}}/2$ |
| 9  $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 $u_{13} = [1\ -1\ 1\ 1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Wherein, $W_n = I - 2u_n u_n^H / u_n^H u_n$, I is a unit matrix, $W_k^{(j)}$ represents the $j^{th}$ column vector of the matrix $W_k$. $W_k^{(j_1, j_2, \cdots j_n)}$ represents a matrix composed by the $j_1^{th}$, $j_2^{th}$, ... $j_n^{th}$ columns of the matrix $W_k$.

SUMMARY OF THE INVENTION

There are the following problems existed in the above-mentioned scheme: not supporting the open loop multi-user spatial multiplexing.

Because of the expansion of the antenna technology, in the 8 transmission antennas application, there is a lack of the corresponding solution.

The main scenario considered when designing the scheme is a channel in a single polarized antenna scenario, and the channel in the dual polarized antenna scenario is not considered.

The technical problem to be solved by the present document is to provide a precoding method and system for open loop spatial multiplexing and a precoding indication method, to implement effective precoding in the case of the open loop spatial multiplexing.

In order to solve the above-mentioned technical problem, the present document provides a precoding method for open loop spatial multiplexing, including: in transmission resources, a base station precoding N-layer data to be sent by using $$w_a = \begin{bmatrix} u_a \\ \alpha \cdot u_a \end{bmatrix},$$

wherein $u_a$ is a vector or matrix related to a transmission resource location i; $\alpha$ is a real number or a complex number related to the transmission resource location i; and N is an integer less than or equal to the number of base station transmission antennas.

Preferably, the above-mentioned method further can have the following characteristics:

the $u_a$ contains N columns, the $n^{th}$ column is $V_a^n$, and $V_a^n$ is related with i.

Preferably, the above-mentioned method further can have the following characteristics:

$V_a^n = [1\ e^{j2\pi X/32}\ e^{j4\pi X/32}\ e^{j6\pi X/32}]^T$, wherein, X is an integer, and values of the X are different for different n.

Preferably, the above-mentioned method further can have the following characteristics:

$\alpha$ is a scalar in a following set $\{1, j, -1, -j\}$.

Preferably, the above-mentioned method further can have the following characteristics:

$\alpha = g(i)$;

$$g(i) = \begin{cases} 1, & \mathrm{mod}\left(\left\lfloor \frac{i}{q} \right\rfloor, 4\right) = p1 \\ j, & \mathrm{mod}\left(\left\lfloor \frac{i}{q} \right\rfloor, 4\right) = p2 \\ -1, & \mathrm{mod}\left(\left\lfloor \frac{i}{q} \right\rfloor, 4\right) = p3 \\ -j, & \mathrm{mod}\left(\left\lfloor \frac{i}{q} \right\rfloor, 4\right) = p4; \end{cases}$$

wherein, q is an integer, values of p1, p2, p3 and p4 are one of 1, 2, 3 and 4, and are different from each other;

or, $$g(i) = \begin{cases} 1, & \mathrm{mod}\left(\left\lfloor \frac{i}{q} \right\rfloor, 2\right) = p1 \\ -1, & \mathrm{mod}\left(\left\lfloor \frac{i}{q} \right\rfloor, 2\right) = p3 \end{cases}$$

wherein, q is an integer, values of p1 and p3 are one of 1 and 2, and are different from each other.

Preferably, the above-mentioned method further can have the following characteristics:

in the transmission resources, the base station precodes M-layer data to be sent except the N-layer data by using $$w_b = \begin{bmatrix} u_b \\ \beta \cdot u_b \end{bmatrix},$$

wherein $u_b$ is a vector or matrix related to the transmission resource location i; $\beta$ is a real number or a complex number related to the transmission resource location i; $\beta = -\alpha$ for same transmission resource locations; and N is an integer less than or equal to the number of base station transmission antennas.

Preferably, the above-mentioned method further can have the following characteristics:

the $u_b$ contains M columns, the $m^{th}$ column is $V_b^m$, and $V_b^m$ is related with i.

Preferably, the above-mentioned method further can have the following characteristics:

$V_b^m = [1\ e^{j2\pi X/32}\ e^{j4\pi X/32}\ e^{j6\pi X/32}]^T$, wherein, X is an integer, and values of the X are different for different m.

Preferably, the above-mentioned method further can have the following characteristics:

when the N-layer data and the M-layer data belong to the same user, the $u_a$ and the $u_b$ are same or different; when a sum of the M and the N is greater than 2 and the $u_a$ and the $u_b$ are different, the columns contained in the $u_a$ are a subset of the columns contained in the $u_b$, or the columns contained in the $u_b$ are a subset of the columns contained in the $u_a$.

Preferably, the above-mentioned method further can have the following characteristics:

when the N-layer data and the M-layer data belong to different users, the $u_a$ and the $u_b$ are different.

Preferably, the above-mentioned method further can have the following characteristics:

the $u_a$ and the $u_b$ are orthogonal.

The present document further provides a precoding system for open loop spatial multiplexing, including a base station device; wherein, the base station device is configured to: in transmission resources, precode N-layer data to be sent by using $$w_a = \begin{bmatrix} u_a \\ \alpha \cdot u_a \end{bmatrix},$$

wherein, $u_a$ is a vector or matrix related to a transmission resource location i; α is a real number or a complex number related to the transmission resource location i; and N is an integer less than or equal to the number of base station transmission antennas.

Preferably, the above-mentioned system further can have the following characteristics:

the $u_a$ contains N columns, the $n^{th}$ column is $V_a^n$, and $V_a^n$ is related with i; and $V_a^n = [1\ e^{j2\pi X/32}\ e^{j4\pi X/32}\ e^{j6\pi X/32}]^T$, wherein, X is an integer, and values of the X are different for different n.

Preferably, the above-mentioned system further can have the following characteristics:

α is a scalar in a following set {1, j, −1, −j}.

Preferably, the above-mentioned system further can have the following characteristics:

the base station device is further configured to: in the transmission resources, precode M-layer data to be sent except the N-layer data by using $$w_b = \begin{bmatrix} u_b \\ \beta \cdot u_b \end{bmatrix},$$

wherein $u_b$ is a vector or matrix related to the transmission resource location i; β is a real number or a complex number related to the transmission resource location i; β=−α for same transmission resource locations; and N is an integer less than or equal to the number of base station transmission antennas.

Preferably, the above-mentioned system further can have the following characteristics:

the $u_b$ contains M columns, the $m^{th}$ column is $V_b^m$, and $V_b^m$ is related with i.

Preferably, the above-mentioned system further can have the following characteristics:

when the N-layer data and the M-layer data belong to the same user, the $u_a$ and the $u_b$ are same or different; when a sum of the M and the N is greater than 2 and the $u_a$ and the $u_b$ are different, the columns contained in the $u_a$ are a subset of the columns contained in the $u_b$, or the columns contained in the $u_b$ are a subset of the columns contained in the $u_a$; and when the N-layer data and the M-layer data belong to different users, the $u_a$ and the $u_b$ are orthogonal.

The present document further provides a precoding indication method for open loop spatial multiplexing, including: a base station determining precoding modes of data of all layers to be sent, and notifying terminals corresponding to data of all layers of the precoding modes corresponding to the data of all layers.

Preferably, the above-mentioned system further can have the following characteristics:

the precoding mode refers to the number of precoding operations performed on the data to be sent and the number of the data layers processed in every precoding operation.

Preferably, the above-mentioned system further can have the following characteristics:

the terminals calculate and report channel quality indications according to acquired precoding modes of the data of all layers.

The embodiment of the present document can implement effective precoding in the case of open loop spatial multiplexing, and also can support multiple antennas (such as 8 transmission antennas) application.

PREFERRED EMBODIMENTS OF THE INVENTION

Figure 2:
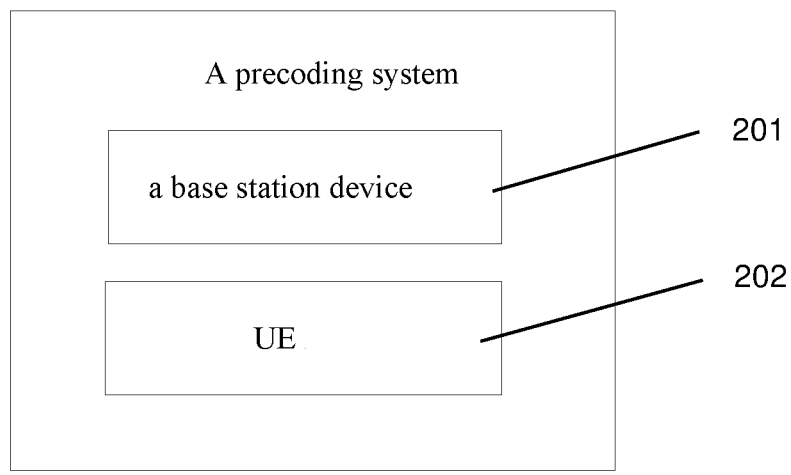
FIG. 2 is an embodiment of a precoding system for open loop spatial multiplexing of the present invention.

The precoding system for open loop spatial multiplexing of the present document is described in FIG. 2, which includes a base station device 201 and at least one terminal/UE 202.

The base station device 201 is used to: in transmission resources, precode N-layer data to be sent by using $$w_a = \begin{bmatrix} u_a \\ \alpha \cdot u_a \end{bmatrix},$$

wherein, $u_a$ is a vector or matrix related to a transmission resource location i; a is a real number or a complex number related to the transmission resource location i; and N is an integer less than or equal to the number of base station transmission antennas.

The $u_a$ contains N columns, the $n^{th}$ column is $V_a^n$, and $V_a^n$ is related with i.

$V_a^n = [1\ e^{j2\pi X/32}\ e^{j4\pi X/32}\ e^{j6\pi X/32}]^T$, wherein, X is an integer, and values of the X are different for different n.

α is a scalar in a following set {1, j, −1, −j}.

α−g(i);

$$g(i) = \begin{cases} 1, & \mathrm{mod}\left(\left\lfloor \frac{i}{q} \right\rfloor, 4\right) = p1 \\ j, & \mathrm{mod}\left(\left\lfloor \frac{i}{q} \right\rfloor, 4\right) = p2 \\ -1, & \mathrm{mod}\left(\left\lfloor \frac{i}{q} \right\rfloor, 4\right) = p3 \\ -j, & \mathrm{mod}\left(\left\lfloor \frac{i}{q} \right\rfloor, 4\right) = p4; \end{cases}$$

wherein, q is an integer, values of p1, p2, p3 and p4 are one of 1, 2, 3 and 4, and are different from each other;

or, $$g(i) = \begin{cases} 1, & \mod\left(\left\lfloor \frac{i}{q} \right\rfloor, 2\right) = p1 \\ -1, & \mod\left(\left\lfloor \frac{i}{q} \right\rfloor, 2\right) = p3 \end{cases}$$

wherein, q is an integer, values of p1 and p3 are one of 1 and 2, and are different from each other.

The base station device 201 is further used to: in the transmission resources, precode M-layer data to be sent except the N-layer data by using $$w_b = \begin{bmatrix} u_b \\ \beta \cdot u_b \end{bmatrix},$$

wherein $u_b$ is a vector or matrix related to the transmission resource location i; $\beta$ is a real number or a complex number related to the transmission resource location i; $\beta = -\alpha$ for same transmission resource locations; and N is an integer less than or equal to the number of base station transmission antennas.

The $u_b$ contains M columns, the $m^{th}$ column is $V_b^m$, and the $V_b^m$ is related with i.

When the N-layer data and the M-layer data belong to a same user, the $u_a$ and the $u_b$ are same or different; when a sum of the M and the N is greater than 2 and the $u_a$ and the $u_b$ are different, the columns contained in the $u_a$ are a subset of the columns contained in the $u^b$, or the columns contained in the $u_b$ are a subset of the columns contained in the $u_a$; and when the N-layer data and the M-layer data belong to different users, the $u_a$ and the $u_b$ are orthogonal.

The at least one terminal/UE 202 is configured to: use precoding modes corresponding to data of all layers determined by the base station device 201.

Figure 1:
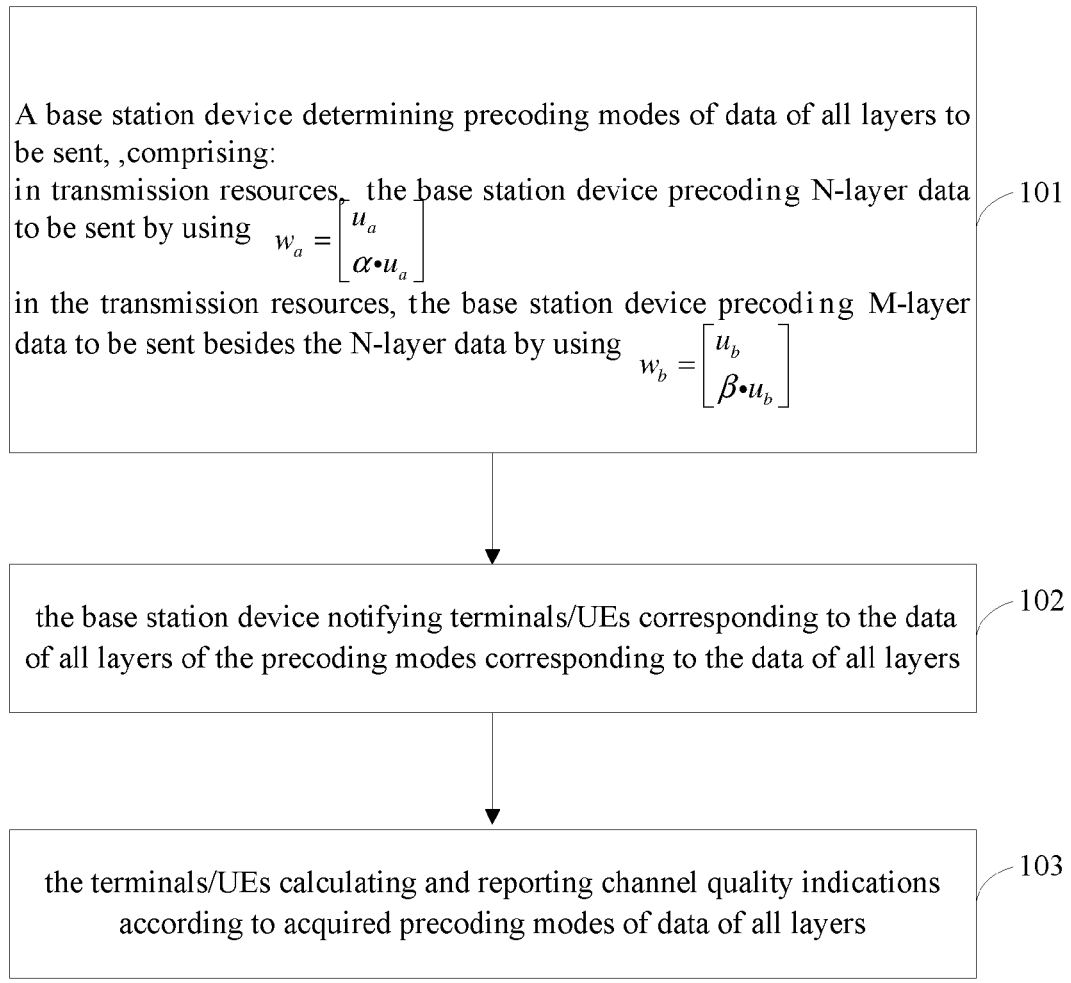
FIG. 1 is an embodiment of a precoding method for open loop spatial multiplexing of the present invention.

The present invention includes a precoding indication method for open loop spatial multiplexing, as shown in FIG. 1, including:

step 101, a base station determining precoding modes of data of all layers to be sent;

step 102, the base station notifying terminals/UEs corresponding to the data of all layers of the precoding modes corresponding to the data of all layers;

Here, the precoding mode refers to the number of precoding operations performed to the data to be sent and the number of the data layers processed in every precoding operation. For example, for a terminal/UE with 2-layer data to be sent totally, one of the usable precoding modes is to perform a whole 2-layer precoding on the 2-layer data; another precoding mode is to perform 1 layer precoding on 1 layer therein and perform 1 layer precoding on another layer therein.

step 103, the terminals/UEs calculating and reporting channel quality indications according to acquired precoding modes of data of all layers.

Wherein the step 101 comprising:

in transmission resources, a base station precoding N-layer data to be sent by using $$w_a = \begin{bmatrix} u_a \\ \alpha \cdot u_a \end{bmatrix},$$

wherein $u_a$ is a vector or matrix related to a transmission resource location i; $\alpha$ is a real number or a complex number related to the transmission resource location i; and N is an integer less than or equal to the number of base station transmission antennas.

Wherein, the $u_a$ contains N columns, the $n^{th}$ column is $V_a^n$, and $V_a^n$ is related with i.

$V_a^n = [1 \; e^{j2\pi X/32} \; e^{j4\pi X/32} \; e^{j6\pi X/32}]^T$, wherein, X is an integer, and values of the X are different for different ns.

$\alpha$ is a scalar in a following set $\{1, j, -1, -j\}$.

Specifically, $\alpha = g(i)$;

$$g(i) = \begin{cases} 1, & \mod\left(\left\lfloor \frac{i}{q} \right\rfloor, 4\right) = p1 \\ j, & \mod\left(\left\lfloor \frac{i}{q} \right\rfloor, 4\right) = p2 \\ -1, & \mod\left(\left\lfloor \frac{i}{q} \right\rfloor, 4\right) = p3 \\ -j, & \mod\left(\left\lfloor \frac{i}{q} \right\rfloor, 4\right) = p4; \end{cases}$$

wherein, q is an integer, values of p1, p2, p3 and p4 are one of 1, 2, 3 and 4, and are different from each other;

or, $$g(i) = \begin{cases} 1, & \mod\left(\left\lfloor \frac{i}{q} \right\rfloor, 2\right) = p1 \\ -1, & \mod\left(\left\lfloor \frac{i}{q} \right\rfloor, 2\right) = p3 \end{cases}$$

wherein, q is an integer, values of p1 and p3 are one of 1 and 2, and are different from each other.

In the present method, when requiring to send the M-layer data except the N-layer data in the transmission resources (that is, in the transmission resources which are same with the above-mentioned transmission resources), the base station precoding M-layer data to be sent except the N-layer data by using $$w_b = \begin{bmatrix} u_b \\ \beta \cdot u_b \end{bmatrix},$$

wherein $u_b$ is a vector or matrix related to the transmission resource location i; $\beta$ is a real number or a complex number related to the transmission resource location i; $\beta = -\alpha$ for same transmission resource locations; and N is an integer less than or equal to the number of base station transmission antennas.

The $u_b$ contains M columns, the $m^{th}$ column is $V_b^m$, and $V_b^m$ is related with i.

$V_b^m = [1 \ e^{j2\pi X/32} \ e^{j4\pi X/32} \ e^{j6\pi X/32}]^T$, wherein, X is an integer, and values of the X are different for different m.

α is a scalar in the following set $\{1, j, -1, -j\}$.

Specifically, α=g(i);

$$g(i) = \begin{cases} 1, & \mod\left(\left\lfloor\dfrac{i}{q}\right\rfloor, 4\right) = p1 \\ j, & \mod\left(\left\lfloor\dfrac{i}{q}\right\rfloor, 4\right) = p2 \\ -1, & \mod\left(\left\lfloor\dfrac{i}{q}\right\rfloor, 4\right) = p3 \\ -j, & \mod\left(\left\lfloor\dfrac{i}{q}\right\rfloor, 4\right) = p4; \end{cases}$$

wherein, q is an integer, values of p1, p2, p3 and p4 are one of 1, 2, 3 and 4, and are different from each other;

or, $$g(i) = \begin{cases} 1, & \mod\left(\left\lfloor\dfrac{i}{q}\right\rfloor, 2\right) = p1 \\ -1, & \mod\left(\left\lfloor\dfrac{i}{q}\right\rfloor, 2\right) = p3 \end{cases}$$

wherein, q is an integer, values of p1 and p3 are one of 1 and 2, and are different from each other.

When the N-layer data and the M-layer data belong to a same user, the $u_a$ and the $u_b$ are same or different; when a sum of the M and the N is greater than 2 and the $u_a$ and the $u_b$ are different, the columns contained in the $u_a$ are a subset of the columns contained in the $u_b$, or the columns contained in the $u_b$ are a subset of the columns contained in the $u_a$.

When the N-layer data and the M-layer data belong to different users, the $u_a$ and the $u_b$ are different; specifically, the $u_a$ and the $u_b$ are orthogonal.

The present document is described in detail by combining with the specific embodiments hereinafter.

Embodiment 1 the sending end (the base station) performs the open loop precoding on at least 2 UEs.

The open loop precoding method used by the base station is not based on the feedback of the receiving end (UE), but based on a predetermined open loop precoding mode.

For example, that open loop precoding mode is that: in a segment of transmission resources, such as Nb minimum transmission resources (Resource Element, abbreviated as REs), the base station serves 2 UEs, and each UE is of one layer.

One UE therein uses the following precoding mode:

$$w_a(i, md_a) = \begin{bmatrix} u_a \\ \alpha \cdot u_a \end{bmatrix} = \begin{bmatrix} v_{f_a(i)} \\ g(md_a, i)v_{f_a(i)} \end{bmatrix}$$

Wherein, $u_a$ contains one column $V_a^1$, and the column is $v_{f_a(i)}$ α=g($md_a$,i).

$v_{f_a(i)} = [1 \ e^{j2\pi f_a(i)/32} \ e^{j4\pi f_a(i)/32} \ e^{j6\pi f_a(i)/32}]^T$.

g($md_a$,i)=$j^{(md_a+i)}$, wherein, $md_a$ is an initial value, i is a resource index number, and j is an imaginary number identifier.

Another UE uses the following precoding mode:

$$w_b(i, md_b) = \begin{bmatrix} u_b \\ \beta \cdot u_b \end{bmatrix} = \begin{bmatrix} v_{f_b(i)} \\ g(md_b, i)v_{f_b(i)} \end{bmatrix}$$

Wherein, $u^b$ contains one column $V_b^1$, and the column is $v_{f_b(i)}$. β=g($md_b$,i).

$v_{f_b(i)} = [1 \ e^{j2\pi f_b(i)/32} \ e^{j4\pi f_b(i)/32} \ e^{j6\pi f_b(i)/32}]^T$.

g($md_b$,i)=$j^{(md_b+i)}$, $md_b$ is an initial value, i is a resource index number, and j is an imaginary number identifier.

g($md_b$,i) needs to be equal to -g($md_a$,i), and further g($md_b$,i) and the g($md_a$,i) can be scalars of the following set $\{1, j, -1, -j\}$.

Further, $$g(md_a, i) = \begin{cases} 1, & \mod\left(\left\lfloor\dfrac{i}{q}\right\rfloor, 4\right) = p1 \\ j, & \mod\left(\left\lfloor\dfrac{i}{q}\right\rfloor, 4\right) = p2 \\ -1, & \mod\left(\left\lfloor\dfrac{i}{q}\right\rfloor, 4\right) = p3 \\ -j, & \mod\left(\left\lfloor\dfrac{i}{q}\right\rfloor, 4\right) = p4. \end{cases}$$

Wherein, q is an integer, and the values of p1, p2, p3 and p4 are one of 1, 2, 3 and 4, and are different from each other;

Or, it can be:

$$g(md_a, i) = \begin{cases} 1, & \mod\left(\left\lfloor\dfrac{i}{q}\right\rfloor, 2\right) = p1 \\ -1, & \mod\left(\left\lfloor\dfrac{i}{q}\right\rfloor, 2\right) = p3, \end{cases}$$

wherein, the values of p1 and p3 are one of 1 and 2, and are different from each other;

preferably, $f_a(i)=K_a i+N_a$, and $f_b(i)=K_b i+N_b$; preferably, $v_{f_b(i)}$ and $v_{f_a(i)}$ are orthogonal, $K_a$ $N_a$ $K_b$ $N_b$ are all integers; preferably, $f_b(i)=f_a(i)\pm 4N$ or $f_b(i)=f_a(i)\pm 8N$, wherein, N is a positive integer.

Embodiment 2 the sending end (the base station) performs the open loop precoding on at least 2 UEs.

The open loop precoding method used by the base station is not based on the feedback of the receiving end (UE), but based on a predetermined open loop precoding mode.

For example, that open loop precoding mode is that: in a segment of transmission resources, such as Nb minimum transmission resources (Resource Element, abbreviated as REs), the base station serves 2 UEs, wherein, one UE is of two layers, and one UE is of one layer.

One UE therein uses the following precoding mode:

$$w_a(i, md_a) = \begin{bmatrix} u_a \\ \alpha \cdot u_a \end{bmatrix} = \begin{bmatrix} v_{f_a(i)} & v_{h_a(i)} \\ g(md, i)v_{f_a(i)} & g(md, i)v_{h_a(i)} \end{bmatrix}$$

Wherein, $u_a$ contains two columns; the first column $V_a^1$ is $v_{f_a(i)}$, and the second column $V_a^2$ is $v_{h_a(i)}$. α=g($md_a$,i).

$v_{f_a(i)} = [1 \ e^{j2\pi f_a(i)/32} \ e^{j4\pi f_a(i)/32} \ e^{j6\pi f_a(i)/32}]^T$.

$v_{h_a(i)} = [1 \ e^{j2\pi h_a(i)/32} \ e^{j4\pi h_a(i)/32} \ e^{j6\pi h_a(i)/32}]^T$.

$g(md_a,i)=j^{(md_a+i)}$, wherein, $md_a$ is an initial value, i is a resource index number, and j is an imaginary number identifier.

Another UE uses the following precoding mode:

$$w_b(i, md_b) = \begin{bmatrix} u_b \\ \beta \cdot u_b \end{bmatrix} = \begin{bmatrix} v_{f_b(i)} \\ g(md_b, i)v_{f_b(i)} \end{bmatrix}$$

Wherein, $u_b$ contains one column $V_b^1$, and the column is $v_{f_b(i)}$. $\beta=g(md_b,i)$.

$v_{f_b(i)}=[1 \; e^{j2\pi f_b(i)/32} \; e^{j4\pi f_b(i)/32} \; e^{j6\pi f_b(i)/32}]^T$.

$g(md_b,i)=j^{(md_b+i)}$, $md_b$ is an initial value, i is a resource index number, and j is an imaginary number identifier.

$g(md_b,i)$ needs to be equal to $-g(md_a,i)$, and further $g(md_b,i)$ and the $g(md_a,i)$ can be scalars of the following set $\{1, j, -1, -j\}$.

Further, $$g(md_a, i) = \begin{cases} 1, & \mod\left(\left\lfloor\frac{i}{q}\right\rfloor, 4\right) = p1 \\ j, & \mod\left(\left\lfloor\frac{i}{q}\right\rfloor, 4\right) = p2 \\ -1, & \mod\left(\left\lfloor\frac{i}{q}\right\rfloor, 4\right) = p3 \\ -j, & \mod\left(\left\lfloor\frac{i}{q}\right\rfloor, 4\right) = p4 \end{cases}$$

Wherein, q is an integer, and the values of p1, p2, p3 and p4 are one of 1, 2, 3 and 4, and are different from each other;

Or, it can be:

$$g(md_a, i) = \begin{cases} 1, & \mod\left(\left\lfloor\frac{i}{q}\right\rfloor, 2\right) = p1 \\ -1, & \mod\left(\left\lfloor\frac{i}{q}\right\rfloor, 2\right) = p3, \end{cases}$$

wherein, the values of p1 and p3 are one of 1 and 2, and are different from each other;

preferably, $f_a(i)=K_a i+N_a$, $f_b(i)=K_b i+N_b$, and $h_a(i)=K_a i+\overline{N_a}$; preferably, $v_{f_a(i)}$ is orthogonal with both $v_{f_a(i)}$ and $v_{h_a(i)}$; preferably, $v_{f_a(i)}$ and $v_{h_a(i)}$ are the same; $K_a$, $N_a$, $K_b$, $N_b$, $\overline{K_a}$, and $\overline{N_a}$ are all integers.

Preferably, $f_b(i)=f_a(i)\pm 4N$ or $f_b(i)=f_a(i)\pm 8N$, wherein, N is a positive integer.

Preferably, $h_a(i)=f_a(i)\pm 4M$ or $h_a(i)=f_a(i)\pm 8M$, wherein, M is a positive integer.

Embodiment 3 the sending end (the base station) performs the open loop precoding on at least 2 UEs.

The open loop precoding method used by the base station is not based on the feedback of the receiving end (UE), but based on a predetermined open loop precoding mode.

Preferably, that open loop precoding mode is that: in a segment of transmission resources, such as Nb minimum transmission resources (Resource Element, abbreviated as REs), the base station serves 2 UEs, wherein, the two UEs are all of two layers.

One UE therein uses the following precoding mode:

$$w_a(i, md_a) = \begin{bmatrix} u_a \\ \alpha \cdot u_a \end{bmatrix} = \begin{bmatrix} v_{f_a(i)} & v_{h_a(i)} \\ g(md, i)v_{f_a(i)} & g(md, i)v_{h_a(i)} \end{bmatrix}$$

Wherein, $u_a$ contains two columns; the first column $V_a^1$ is $v_{f_a(i)}$, and the second column $V_a^2$ is $v_{h_a(i)}$. $\alpha=g(md_a,i)$.

$v_{f_a(i)}=[1 \; e^{j2\pi f_a(i)/32} \; e^{j4\pi f_a(i)/32} \; e^{j6\pi f_a(i)/32}]^T$.

$v_{h_a(i)}=[1 \; e^{j2\pi h_a(i)/32} \; e^{j4\pi h_a(i)/32} \; e^{j6\pi h_a(i)/32}]^T$.

$g(md_a,i)=j^{(md_a+i)}$, wherein, $md_a$ is an initial value, i is a resource index number, and j is an imaginary number identifier.

Another UE uses the following precoding mode:

$$w_b(i, md_b) = \begin{bmatrix} u_b \\ \beta \cdot u_b \end{bmatrix} = \begin{bmatrix} v_{f_b(i)} & v_{h_b(i)} \\ g(md_b, i)v_{f_b(i)} & g(md_b, i)v_{h_b(i)} \end{bmatrix}$$

Wherein, $u_b$ contains two columns; the first column $V_b^1$ is $v_{f_b(i)}$, and the second column $V_b^2$ is $v_{h_b(i)}$. $\beta=g(md_b,i)$.

$v_{f_b(i)}=[1 \; e^{j2\pi f_b(i)/32} \; e^{j4\pi f_b(i)/32} \; e^{j6\pi f_b(i)/32}]^T$.

$v_{h_b(i)}=[1 \; e^{j2\pi h_b(i)/32} \; e^{j4\pi h_b(i)/32} \; e^{j6\pi h_b(i)/32}]^T$.

$g(md_b,i)=j^{md_b+1)}$, $md_b$ is an initial value, i is a resource index number, and j is an imaginary number identifier.

$g(md_b,i)$ needs to be equal to $-g(md_a,i)$; $g(md_b,i)$ needs to be equal to $-g(md_a,i)$ and further, $g(md_b,i)$ and the $g(md_a,i)$ can be scalars of the following set $\{1, j, -1, -j\}$.

Further, $$g(md_a, i) = \begin{cases} 1, & \mod\left(\left\lfloor\frac{i}{q}\right\rfloor, 4\right) = p1 \\ j, & \mod\left(\left\lfloor\frac{i}{q}\right\rfloor, 4\right) = p2 \\ -1, & \mod\left(\left\lfloor\frac{i}{q}\right\rfloor, 4\right) = p3 \\ -j, & \mod\left(\left\lfloor\frac{i}{q}\right\rfloor, 4\right) = p4 \end{cases}$$

Wherein, q is an integer, and the values of p1, p2, p3 and p4 are one of 1, 2, 3 and 4, and are different from each other;

Or, it can be:

$$g(md_a, i) = \begin{cases} 1, & \mod\left(\left\lfloor\frac{i}{q}\right\rfloor, 2\right) = p1 \\ -1, & \mod\left(\left\lfloor\frac{i}{q}\right\rfloor, 2\right) = p3, \end{cases}$$

wherein, the values of p1 and p3 are one of 1 and 2, and are different from each other;

preferably, $f_a(i)=K_a i+N_a$, $f_b(i)=K_b i+N_b$, $h_a(i)=\overline{K_a}i+\overline{N_a}$ and $h_b(i)=\overline{K_b}i+\overline{N_b}$; preferably, $v_{f_a(i)}$ is orthogonal with both $v_{f_b(i)}$ and $v_{h_a(i)}$, and $v_{h_b(i)}$ is orthogonal with both $v_{f_b(i)}$ and $v_{h_a(i)}$; preferably, $v_{f_a(i)}$ and $v_{h_a(i)}$ are the same; preferably, $v_{f_b(i)}$ and $v_{h_b(i)}$ are the same; and $K_a$, $N_a$, $K_b$, $N_b$, $\overline{K_a}$, $\overline{N_a}$, $\overline{K_b}$, and $\overline{N_b}$ are all integers.

Preferably, $f_b(i)=f_a(i)\pm 4N$ or $f_b(i)=f_a(i)\pm 8N$, wherein, N is a positive integer.

Preferably, $h_a(i)=f_a(i)\pm 4M$ or $h_a(i)=f_a(i)\pm 8M$, wherein, M is a positive integer.

Embodiment 4 the sending end (the base station) performs the open loop precoding on at least 1 UE.

The open loop precoding method used by the base station is not based on the feedback of the receiving end (UE), but based on a predetermined open loop precoding mode.

Preferably, that open loop precoding mode is that: in a segment of transmission resources, such as Nb minimum transmission resources (Resource Element, abbreviated as REs), the base station serves 1 UE, wherein, the UE is of one layer transmission.

The UE uses the following precoding mode:

$$w_a(i, md_a) = \begin{bmatrix} u_a \\ \alpha \cdot u_a \end{bmatrix} = \begin{bmatrix} v_{f_a(i)} \\ g(md_a, i)v_{f_a(i)} \end{bmatrix}$$

Wherein, $u_a$ contains one column $V_a^1$; the column is $v_{f_a(i)}$. $\alpha = g(md_a, i)$.
$v_{f_a(i)} = [1\ e^{j2\pi f_a(i)/32}\ e^{j4\pi f_a(i)/32}\ e^{j6\pi f_a(i)/32}]^T$.
$g(md_a, i) = j^{(md_a+i)}$, wherein, $md_a$ is an initial value, i is a resource index number, and j is an imaginary number identifier.

Preferably, $f_a(i) = K_a i + N_a$.

Embodiment 5 the sending end (the base station) performs the open loop precoding on at least 1 UE.

The open loop precoding method used by the base station is not based on the feedback of the receiving end (UE), but based on a predetermined open loop precoding mode.

Preferably, that open loop precoding mode is that: in a segment of transmission resources, such as Nb minimum transmission resources (Resource Element, abbreviated as REs), the base station serves 1 UE, wherein, the UE is of two-layer transmission.

The UE uses the following precoding mode:
one layer of the UE uses the following precoding mode:

$$w_a(i, md_a) = \begin{bmatrix} u_a \\ \alpha \cdot u_a \end{bmatrix} = \begin{bmatrix} v_{f_a(i)} \\ g(md_a, i)v_{f_a(i)} \end{bmatrix}$$

Wherein, $u_a$ contains one column $V_a^1$; the column is $v_{f_a(i)}$. $\alpha = g(md_a, i)$.
$v_{f_a(i)} = [1\ e^{j2\pi f_a(i)/32}\ e^{j4\pi f_a(i)/32}\ e^{j6\pi f_a(i)/32}]^T$.
$g(md_a, i) = j^{(md_a+i)}$, wherein, $md_a$ is an initial value, i is a resource index number, and j is an imaginary number identifier.

Another layer of the UE uses the following precoding mode:

$$w_b(i, md_b) = \begin{bmatrix} u_b \\ \beta \cdot u_b \end{bmatrix} = \begin{bmatrix} v_{f_b(i)} \\ g(md_b, i)v_{f_b(i)} \end{bmatrix}$$

Wherein, $u_b$ contains one column $V_b^1$; the column is $v_{f_b(i)}$. $\beta = g(md_b, i)$.
$v_{f_b(i)} = [1\ e^{j2\pi f_b(i)/32}\ e^{j4\pi f_b(i)/32}\ e^{j6\pi f_b(i)/32}]^T$.
$g(md_b, i) = j^{(md_b+i)}$, wherein, $md_b$ is an initial value, i is a resource index number, and j is an imaginary number identifier.

$g(md_b, i)$ needs to be equal to $-g(md_a, i)$.

Preferably, $f_a(i) = K_a i + N_a$, and $f_b(i) = K_b i + N_b$; preferably, $v_{f_b(i)}$ and $v_{f_a(i)}$ are the same; and $K_a$, $N_a$, $K_b$ and $N_b$ are all integers.

Preferably, it can be that $v_{f_b(i)}$ and $v_{f_a(i)}$ are different; $f_b(i) = f_a(i) \pm N$, wherein, N is an integer in 0~4.

Embodiment 6 the sending end (the base station) performs the open loop precoding on at least 2 UEs.

The open loop precoding method used by the base station is not based on the feedback of the receiving end (UE), but based on a predetermined open loop precoding mode.

Preferably, that open loop precoding mode is that: in a segment of transmission resources, such as Nb minimum transmission resources (Resource Element, abbreviated as REs), the base station serves 1 UE, wherein, the UE is of four layers.

Two layers therein use the following precoding mode:

$$w_a(i, md_a) = \begin{bmatrix} u_a \\ \alpha \cdot u_a \end{bmatrix} = \begin{bmatrix} v_{f_a(i)} & v_{h_a(i)} \\ g(md, i)v_{f_a(i)} & g(md, i)v_{h_a(i)} \end{bmatrix}$$

Wherein, $u_a$ contains two columns; the first column $V_a^1$ is $v_{f_a(i)}$, and the second column $V_a^2$ is $v_{h_a(i)}$. $\alpha = g(md_a, i)$.
$v_{f_a(i)} = [1\ e^{j2\pi f_a(i)/32}\ e^{j4\pi f_a(i)/32}\ e^{j6\pi f_a(i)/32}]^T$.
$v_{h_a(i)} = [1\ e^{j2\pi h_a(i)/32}\ e^{j4\pi h_a(i)/32}\ e^{j6\pi h_a(i)/32}]^T$.
$g(md_a, i) = j^{md_a+i}$, wherein, $md_a$ is an initial value, i is a resource index number, and j is an imaginary number identifier.

Another two layers use the following precoding mode:

$$w_b(i, md_b) = \begin{bmatrix} u_b \\ \beta \cdot u_b \end{bmatrix} = \begin{bmatrix} v_{f_b(i)} & v_{h_b(i)} \\ g(md_b, i)v_{f_b(i)} & g(md_b, i)v_{h_b(i)} \end{bmatrix}$$

Wherein, $u_b$ contains two columns; the first column $V_b^1$ is $v_{f_b(i)}$, and the second column $V_b^2$ is $v_{h_b(i)}$. $\beta = g(md_b, i)$.
$v_{f_b(i)} = [1\ e^{j2\pi f_b(i)/32}\ e^{j4\pi f_b(i)/32}\ e^{j6\pi f_b(i)/32}]^T$.
$v_{h_b(i)} = [1\ e^{j2\pi h_b(i)/32}\ e^{j4\pi h_b(i)/32}\ e^{j6\pi h_b(i)/32}]^T$.
$g(md_b, i) = j^{(md_b+i)}$, $md_b$ is an initial value, i is a resource index number, and j is an imaginary number identifier.

$g(md_b, i)$ needs to be equal to $-g(md_a, i)$.

preferably, $f_a(i) = K_a i + N_a$, $f_b(i) = K_b i + N_b$, $h_a(i) = \overline{K_a}i + \overline{N_a}$ and $h_b(i) = \overline{K_b}i + \overline{N_b}$; and $K_a$, $N_a$, $K_b$, $N_b$, $\overline{K_a}$, $\overline{N_a}$, $\overline{K_b}$, and $\overline{N_b}$ are all integers.

Preferably, $v_{f_b(i)}$ and $v_{f_a(i)}$ are different; $f_b(i) = f_a(i) \pm N$, wherein, N is an integer in 0~8.

Preferably, $v_{h_a(i)}$ is equal to $v_{f_a(i)}$, and $v_{h_b(i)}$ is equal to $v_{f_b(i)}$.

It is described by providing the specific embodiments hereinafter.

Specific Embodiment 1 the sending end (the base station) performs the open loop precoding on at least 2 UEs.

The open loop precoding method used by the base station is not based on the feedback of the receiving end (UE), but based on a predetermined open loop precoding mode.

Preferably, that open loop precoding mode is that: in a segment of transmission resources, such as Nb minimum transmission resources (Resource Element, abbreviated as REs), the base station serves 2 UEs, and each UE is of one layer.

One UE therein uses the following precoding mode:

$$w_a(i, md_a) = \begin{cases} W_0^{\{1\}}, & \mathrm{mod}\left(\left\lfloor \frac{i}{q} \right\rfloor, 4\right) = p1 \\ W_2^{\{1\}}, & \mathrm{mod}\left(\left\lfloor \frac{i}{q} \right\rfloor, 4\right) = p2 \\ W_8^{\{1\}}, & \mathrm{mod}\left(\left\lfloor \frac{i}{q} \right\rfloor, 4\right) = p3 \\ W_{10}^{\{1\}}, & \mathrm{mod}\left(\left\lfloor \frac{i}{q} \right\rfloor, 4\right) = p4 \end{cases}$$

Wherein, q is an integer, and the values of p1, p2, p3 and p4 are one of 1, 2, 3 and 4, and are different from each other; $W_0^{\{1\}}$, $W_2^{\{1\}}$, $W_8^{\{1\}}$ and $W_{10}^{\{1\}}$ are same with the definition in the LTE 4 antenna codebook. $md_a$ is a parameter related to the number of layers or the mode.

Another user uses the following precoding mode:

$$w_b(i, md_b) = \begin{cases} W_1^{\{1\}}, & \mathrm{mod}\left(\left\lfloor \frac{i}{q} \right\rfloor, 4\right) = q1 \\ W_3^{\{1\}}, & \mathrm{mod}\left(\left\lfloor \frac{i}{q} \right\rfloor, 4\right) = q2 \\ W_9^{\{1\}}, & \mathrm{mod}\left(\left\lfloor \frac{i}{q} \right\rfloor, 4\right) = q3 \\ W_{11}^{\{1\}}, & \mathrm{mod}\left(\left\lfloor \frac{i}{q} \right\rfloor, 4\right) = q4 \end{cases}$$

Wherein, q is an integer, and the values of q1, q2, q3 and q4 are one of 1, 2, 3 and 4, and are different from each other; $W_1^{\{1\}}$, $W_3^{\{1\}}$, $W_9^{\{1\}}$ and $W_{11}^{\{1\}}$ are same with the definition in the LTE 4 antenna codebook. $md_b$ is a parameter related to the number of layers or the mode.

Specific Embodiment 2 the sending end (the base station) performs the open loop precoding on at least 1 UE.

The open loop precoding method used by the base station is not based on the feedback of the receiving end (UE), but based on a predetermined open loop precoding mode.

Preferably, that open loop precoding mode is that: in a segment of transmission resources, such as Nb minimum transmission resources (Resource Element, abbreviated as REs), the base station serves 1 UE, and the UE is of two-layer transmission.

The UE uses the following precoding mode:

$$w(i) = \begin{cases} W_1^{\{1,2\}}, & \mathrm{mod}\left(\left\lfloor \frac{i}{q} \right\rfloor, 4\right) = p1 \\ W_2^{\{1,2\}}, & \mathrm{mod}\left(\left\lfloor \frac{i}{q} \right\rfloor, 4\right) = p2 \\ W_3^{\{1,2\}}, & \mathrm{mod}\left(\left\lfloor \frac{i}{q} \right\rfloor, 4\right) = p3 \\ W_8^{\{1,2\}}, & \mathrm{mod}\left(\left\lfloor \frac{i}{q} \right\rfloor, 4\right) = p4 \end{cases}$$

Wherein, q is an integer, and the values of p1, p2, p3 and p4 are one of 1, 2, 3 and 4, and are different from each other; $W_1^{\{1,2\}}$, $W_2^{\{1,2\}}$, $W_3^{\{1,2\}}$ and $W_8^{\{1,2\}}$ are same with the definition in the LTE 4 antenna codebook.

It is worth to be indicated that, in this text, every column of the described vector or matrix being multiplied by a constant coefficient belongs to the equivalent transform of the present document, and will not influence the implementation effect of the present document.

In addition, as to all matrixes of the present document, performing an arbitrary column exchange on a column contained therein belongs to the equivalent transform, and will not influence its implementation effect.

It should be illustrated that, in the case of not conflicting, the embodiments in the present application and features in these embodiments can be combined with each other.

Certainly, the present document can have a variety of other embodiments. Those skilled in the art can make the corresponding modifications and variations according to the present document without departing from the spirit and essence of the present document. And all of these modifications or the variations should be embodied in the scope of the appended claims of the present document.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

INDUSTRIAL APPLICABILITY

The embodiment of the present document can implement effective precoding in the case of open loop spatial multiplexing, and also can support multiple antennas (such as 8 transmission antennas) application.

What we claim is:

1. A precoding method for open loop spatial multiplexing, comprising:
   determining, by a base station, precoding modes of data of M+N layers to be sent, comprising:
   in transmission resources, precoding, by the base station, N-layer data to be sent by using $$w_a = \begin{bmatrix} u_a \\ a \cdot u_a \end{bmatrix},$$

wherein $u_a$ is a vector or matrix related to a transmission resource location i; α is a real number or a complex number related to the transmission resource location i; and N is an integer less than or equal to a number of base station transmission antennas;
   in the transmission resources, precoding, by the base station, M-layer data to be sent except the N-layer data by using $$w_b = \begin{bmatrix} u_b \\ \beta \cdot u_b \end{bmatrix}$$

wherein $u_b$ is a vector or matrix related to the transmission resource location i; $\beta$ is a real number or a complex number related to the transmission resource location i; $\beta = -\alpha$ for same transmission resource locations, and M is an integer less than or equal to the number of base station transmission antennas.

2. The method according to claim 1, wherein,
the $u_a$ contains N columns, the $n^{th}$ column is $V_a^n$, and $V_a^n$ is related with the transmission resource location i.

3. The method according to claim 2, wherein,
$V_a^n = [1 \ e^{j2\pi X/32} \ e^{j4\pi X/32} \ e^{j6\pi X/32}]^T$, wherein, X is an integer, and values of the X are different for different n.

4. The method according to claim 1, wherein,
$\alpha$ is a scalar in a following set $\{1, j, -1, -j\}$.

5. The method according to claim 4, wherein,
$\alpha = g(i)$;

$$g(i) = \begin{cases} 1, & \mathrm{mod}\left(\left\lfloor \frac{i}{q} \right\rfloor, 4\right) = p1 \\ j, & \mathrm{mod}\left(\left\lfloor \frac{i}{q} \right\rfloor, 4\right) = p2 \\ -1, & \mathrm{mod}\left(\left\lfloor \frac{i}{q} \right\rfloor, 4\right) = p3 \\ -j, & \mathrm{mod}\left(\left\lfloor \frac{i}{q} \right\rfloor, 4\right) = p4; \end{cases}$$

wherein, q is an integer, values of p1, p2, p3 and p4 are one of 1, 2, 3 and 4, and are different from each other; or, $$g(i) = \begin{cases} 1, & \mathrm{mod}\left(\left\lfloor \frac{i}{q} \right\rfloor, 2\right) = p1 \\ -1, & \mathrm{mod}\left(\left\lfloor \frac{i}{q} \right\rfloor, 2\right) = p3 \end{cases}$$

wherein, q is an integer, values of p1 and p3 are one of 1 and 2, and are different from each other.

6. The method according to claim 1, wherein,
the $u_b$ contains M columns, the $m^{th}$ column is $v_b^m$, and $v_b^m$ is related with the transmission resource location i.

7. The method according to claim 6, wherein,
$v_b^m = [1 \ e^{j2\pi X/32} \ e^{j4\pi X/32} \ e^{j6\pi X/32}]^T$, wherein, X is an integer, and values of the X are different for different m, T represents transposing operation on a matrix.

8. The method according to claim 6, wherein,
when the N-layer data and the M-layer data belong to a same user equipment (UE) which is served by the base station, the $u_a$ and the $u_b$ are same or different; when a sum of the M and the N is greater than 2 and the $u_a$ and the $u_b$ are different, the columns contained in the $u_a$ are a subset of the columns contained in the $u_b$, or the columns contained in the $u_b$ are a subset of the columns contained in the $u_a$.

9. The method according to claim 6, wherein,
when the N-layer data and the M-layer data belong to different user equipments which are served by the base station, the $u_a$ and the $u_b$ are different.

10. The method according to claim 9, wherein,
the $u_a$ and the $u_b$ are orthogonal.

11. The method according to claim 1, further comprising:
notifying, by the base station, user equipments (UEs) corresponding to the data of all layers of the precoding modes corresponding to the data of all layers, the precoding modes refer to the number of precoding operations performed on the data to be sent and the number of the data layers processed in every precoding operation.

12. The method according to claim 11, further comprising, calculating and reporting, by the UEs, channel quality indications according to acquired precoding modes of the data of all layers.

13. A precoding system for open loop spatial multiplexing, comprising: a base station device and at least one user equipment (UE) served by the base station device, wherein,
the base station device is configured to:
in transmission resources, precode N-layer data to be sent by using $$w_a = \begin{bmatrix} u_a \\ a \cdot u_a \end{bmatrix},$$

wherein, $u_a$ is a vector or matrix related to a transmission resource location i; $\alpha$ is a real number or a complex number related to the transmission resource location i; and N is an integer less than or equal to a number of base station transmission antennas;
in the transmission resources, precode M-layer data to be sent except the N-layer data by using $$w_b = \begin{bmatrix} u_b \\ \beta \cdot u_b \end{bmatrix},$$

wherein $u_b$ is a vector or matrix related to the transmission resource location i; $\beta$ is a real number or a complex number related to the transmission resource location i; $\beta = -\alpha$ for same transmission resource locations, and M is an integer less than or equal to the number of base station transmission antennas;
the at least one UE is configured to: use precoding modes corresponding to data of all layers determined by the base station device.

14. The system according to claim 13, wherein,
the $u_a$ contains N columns, the $n^{th}$ column is $V_a^n$, and $V_a^n$ is related with the transmission resource location i; and
$V_a^n = [1 \ e^{j2\pi X/32} \ e^{j4\pi X/32} \ e^{j6\pi X/32}]^T$, wherein, X is an integer, and values of the X are different for different n.

15. The system according to claim 13, wherein,
$\alpha$ is a scalar in a following set $\{1, j, -1, -j\}$.

16. The system according to claim 13, wherein,
the $u_b$ contains M columns, the $m^{th}$ column is $v_b^m$, and $v_b^m$ is related with the transmission resource location i.

17. The system according to claim 16, wherein,
when the N-layer data and the M-layer data belong to a same user equipment (UE) which is served by the base station, the $u_a$ and the $u_b$ are same or different; when a sum of the M and the N is greater than 2 and the $u_a$ and the $u_b$ are different, the columns contained in the $u_a$ are a subset of the columns contained in the $u_b$, or the columns contained in the $u_b$ are a subset of the columns contained in the $u_a$; and
when the N-layer data and the M-layer data belong to different user equipments, the $u_a$ and the $u_b$ are orthogonal.

* * * * *